(12) United States Patent
Weinkoetz et al.

(10) Patent No.: US 10,876,001 B2
(45) Date of Patent: Dec. 29, 2020

(54) METHOD FOR PRODUCING LIGNOCELLULOSE MATERIALS

(71) Applicant: BASF SE, Ludwigshafen am Rhein (DE)

(72) Inventors: Stephan Weinkoetz, Ludwigshafen am Rhein (DE); Jean-Pierre Berkan Lindner, Ludwigshafen am Rhein (DE); Ralph Lunkwitz, Ludwigshafen am Rhein (DE); Claus Fueger, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 86 days.

(21) Appl. No.: 16/335,285

(22) PCT Filed: Sep. 13, 2017

(86) PCT No.: PCT/EP2017/072987
§ 371 (c)(1),
(2) Date: Mar. 21, 2019

(87) PCT Pub. No.: WO2018/054732
PCT Pub. Date: Mar. 29, 2018

(65) Prior Publication Data
US 2020/0017688 A1    Jan. 16, 2020

(30) Foreign Application Priority Data
Sep. 23, 2016  (EP) .................................. 16190412

(51) Int. Cl.
*B27N 3/02*      (2006.01)
*B27N 3/08*      (2006.01)
(Continued)

(52) U.S. Cl.
CPC ................ *C08L 97/02* (2013.01); *C08J 5/18* (2013.01); *C08K 5/09* (2013.01); *C08K 5/29* (2013.01);
(Continued)

(58) Field of Classification Search
CPC ... C08L 97/02; C08K 5/09; C08K 5/29; C08J 5/18; C08J 2397/02; B27N 3/02; B27N 3/002; B27N 3/08
See application file for complete search history.

(56) References Cited
U.S. PATENT DOCUMENTS 5,112,875 A    5/1992  Zimmermann et al.
5,401,582 A    3/1995  Weyland et al.
(Continued)

FOREIGN PATENT DOCUMENTS

AU    2002250854 A1    8/2002
AU    2003268935 A1    5/2004
(Continued)

OTHER PUBLICATIONS

International Search Report for PCT/EP2017/072987 dated Oct. 25, 2017.
(Continued)

*Primary Examiner* — Vu A Nguyen
(74) *Attorney, Agent, or Firm* — Faegre Drinker Biddle & Reath LLP

(57) ABSTRACT

The present invention relates to a novel and improved, batchwise or continuous, preferably continuous, process for producing single-layer or multilayer lignocellulose materials, comprising the process steps of
  (Ia) producing a mixture M1 and
  (Ib) optionally one or more mixture(s) M2,
  (II) scattering mixture M1 and any mixture(s) M2 to give a mat,
  (III) optionally precompacting the scattered mat and
  (IV) hot pressing,
in that mixture M1 comprises the lignocellulose particles (component LCP-1) and additionally
  a) 0.005% to 0.5% by weight of organic carboxylic acid, carboxylic anhydride, carbonyl chloride or mixtures thereof (component A)
  b) 0.05% to 3% by weight of organic isocyanates having at least two isocyanate groups (component B) and
  c) 5% to 15% by weight of binder selected from the group of the amino resins (component C)
  d) 0% to 2% by weight of hardener (component D) and
  e) 0% to 5% by weight of additive (component E),
and mixture(s) M2 comprise(s) the lignocellulose particles (component LCP-2) and additionally
  f) 0% to 0.3% by weight of organic carboxylic acid, carboxylic anhydride, carbonyl chloride or mixtures thereof (component F),
  g) 1% to 30% by weight of binder selected from the group consisting of amino resin, phenolic resin, protein-based binder and other polymer-based binders or mixtures thereof (component G-1) and 0% to 3% by weight of organic isocyanate having at least two isocyanate groups (component G-2),
  h) 0% to 2% by weight of hardener (component H) and
  i) 0% to 5% by weight of additives (component I),
with the proviso that the following conditions are fulfilled:

$a_{min} < a < a_{max}$ and $a_{min} = [(-1/6000 \cdot T) + (65/6000)]$, preferably $a_{min} = [(-1/4500 \cdot T) + (65/4500)]$, more preferably $a_{min} = [(-1/3500 \cdot T) + (65/3500)]$ and $a_{max} = [(-1/2000 \cdot T) + (75/2000)]$, preferably $a_{max} = [(-1/2500 \cdot T) + (75/2500)]$, more preferably $a_{max} = [(-1/3000 \cdot T) + (75/3000)]$, (Continued)

where

T is the temperature of mixture M1 in °C. after process step (Ia) and is between 10 and 65° C., preferably 12 and 62° C., more preferably 15 to 60° C., and a is the amount of acid equivalents in component A) in relation to the mass of component C) in mol/100 g.

20 Claims, No Drawings

(51) Int. Cl.
    *C08J 5/18*       (2006.01)
    *C08L 97/02*     (2006.01)
    *C08K 5/09*       (2006.01)
    *C08K 5/29*       (2006.01)

(52) U.S. Cl.
    CPC ....... *C08J 2397/02* (2013.01); *C08L 2203/16* (2013.01)

(56) References Cited

U.S. PATENT DOCUMENTS

| | | |
|---|---|---|
| 5,913,990 A | 6/1999 | Kramer |
| 6,348,530 B1 | 2/2002 | Reck et al. |
| 6,841,608 B1 | 1/2005 | Dreher et al. |
| 2015/0017425 A1 | 1/2015 | Schade et al. |
| 2017/0021525 A1 | 1/2017 | Weinkötz |

FOREIGN PATENT DOCUMENTS

| | | | |
|---|---|---|---|
| CA | 2875209 A1 | 1/2014 | |
| DE | 4003422 A1 | 8/1991 | |
| DE | 19949592 A1 | 4/2001 | |
| DE | 10104047 A1 | 8/2002 | |
| DE | 10247412 A1 | 4/2004 | |
| EP | 1240205 A1 | 9/2002 | |
| EP | 1852231 B1 | 10/2013 | |
| WO | WO-9728936 A1 | 8/1997 | |
| WO | WO-9902591 A1 | 1/1999 | |
| WO | WO-0127163 A1 | 4/2001 | |
| WO | WO-2014005877 A1 | 1/2014 | |
| WO | WO-2015000913 A1 | 1/2015 | |
| WO | WO-2015104349 A2 * | 1/2015 | ............... B27N 3/08 |
| WO | WO-2015104349 A2 | 7/2015 | |

OTHER PUBLICATIONS

Written Opinion of the International Searching Authority for PCT/EP2017/072987 dated Oct. 25, 2017.

* cited by examiner

METHOD FOR PRODUCING LIGNOCELLULOSE MATERIALS

CROSS-REFERENCE TO RELATED APPLICATIONS

This application is a national stage application (under 35 U.S.C. § 371) of PCT/EP2017/072987, filed Sep. 13, 2017, which claims benefit of European Application No. 16190412.3, filed Sep. 23, 2016, both of which are incorporated herein by reference in their entirety.

The present invention relates to a process for producing single-layer or multilayer lignocellulose materials in which specific conditions are observed depending on the temperature of a mixture.

EP-B-1 852 231 discloses a process for producing wood-base materials from comminution products of lignocellulose-containing materials and an adhesive, wherein at least one additive of component C selected from the group of maleic anhydride, fumaric acid, acrylic acid, polyacrylates, homologs of acrylic acid and mixtures thereof is added to the comminution products prior to the hot pressing. It is possible here for component C to be added to the fibers downstream of the refiner, for example together with the blowing-in of the adhesive. Adhesives mentioned include amino resins such as urea-formaldehyde resins (UF resins), adhesives based on isocyanates (PMDI) or a mixture thereof.

WO-A-2015/000913 discloses a process for producing lignocellulose materials, in which the wood particles are glued with a binder and a hardener, preferably with addition of the hardener shortly prior to the use of the binders. Binders mentioned include amino resins, organic isocyanates having at least two isocyanate groups (such as PMDI) or mixtures thereof, and hardeners mentioned are all hardeners known to those skilled in the art or mixtures thereof, especially carboxylic acids, sulfonic acids, phosphoric acid, polyphosphoric acid or salts thereof, such as halides.

These processes leave something to be desired in relation to the production processes therefor.

It is therefore an object of the present invention to remedy the aforementioned disadvantages.

Accordingly, a novel and improved, batchwise or continuous, preferably continuous, process for producing single-layer or multilayer lignocellulose materials has been found, comprising the process steps of (Ia) producing a mixture M1 and
(Ib) optionally one or more mixture(s) M2,
(II) scattering mixture M1 and any mixture(s) M2 to give a mat,
(III) optionally precompacting the scattered mat and
(IV) hot pressing, wherein mixture M1 comprises, preferably consists of, the lignocellulose particles (component LCP-1) and additionally a) 0.005% to 0.5% by weight of organic carboxylic acid, carboxylic anhydride, carbonyl chloride or mixtures thereof (component A)
b) 0.05% to 3% by weight of organic isocyanates having at least two isocyanate groups (component B) and
c) 5% to 15% by weight of binder selected from the group of the amino resins (component C)
d) 0% to 2% by weight of hardener (component D) and
e) 0% to 5% by weight of additive (component E), and mixture(s) M2 comprise(s), preferably consists of, the lignocellulose particles (component LCP-2) and additionally f) 0% to 0.3% by weight of organic carboxylic acid, carboxylic anhydride, carbonyl chloride or mixtures thereof (component F), g) 1% to 30% by weight of binder selected from the group consisting of amino resin, phenolic resin, protein-based binder and other polymer-based binders or mixtures thereof (component G-1) and 0% to 3% by weight of organic isocyanate having at least two isocyanate groups (component G-2),
h) 0% to 2% by weight of hardener (component H) and
i) 0% to 5% by weight of additives (component I), with the proviso that the following conditions are fulfilled:

$$a_{min} \leq a \leq a_{max}$$

and $a_{min}=[(-1/6000 \cdot T)+(65/6000)]$, preferably $a_{min}=[(-1/4500 \cdot T)+(65/4500)]$, more preferably $a_{min}=[(-1/3500 \cdot T)+(65/3500)]$ and $a_{max}=[(-1/2000 \cdot T)+(75/2000)]$, preferably $a_{max}=[(-1/2500 \cdot T)+(75/2500)]$, more preferably $a_{max}=[(-1/3000 \cdot T)+(75/3000)]$, where T is the temperature of mixture M1 in ° C. after process step (Ia) and is between 10 and 65° C., preferably 12 and 62° C., more preferably 15 to 60° C., and a is the amount of acid equivalents in component A) in relation to the mass of component C) in mol/100 g.

In the present invention, the amount of acid equivalents of component A) in the case of carboxylic acids is the amount of carboxylic acid groups in mol, and in the case of carbonyl chlorides is the amount of carbonyl chloride groups in mol. In the case of carboxylic anhydrides, the amount of carboxylic anhydride groups in mol is multiplied by two in order to obtain the amount of acid equivalents in mol. If, for example, acetic acid is used as component A), the amount of acid equivalents of component A) is xmol per xmol of acetic acid. If, for example, maleic anhydride is used as component A), the amount of acid equivalents of component A) is 2×mol per xmol of maleic anhydride.

The amount of acid equivalents of component A) in relation to the mass of component C) is understood to mean the amount of acid equivalents per 100 g of component C), where the 100 g relate to the solids content of the amino resin(s) of component C).

The temperature T of mixture M1 after process step (Ia) is the temperature established 1 to 120 seconds, preferably 1 to 60 seconds, more preferably 1 to 20 seconds, most preferably 10 seconds, after all components A) to E) have been mixed with LCP-1. The temperature T can be measured either by means of contact thermometers or by means of contactlessly measuring thermometers, preferably by means of contactlessly measuring thermometers. Suitable measuring instruments are, for example, radiation thermometers, for example the radiation thermometer from the KTX series from Heitronix Infrarot Messtechnik GmbH. The temperature can also be measured at an earlier or later juncture in the process and this can be used to infer the temperature T by taking account, for example, of the cooling characteristics of the mixture M1, or of the temperatures of the added components.

For illustration of the invention, some examples are described hereinafter: If, for example, a mixture M1 at a temperature T of 50° C. is prepared and 1000 g of LCP-1) and 100 g of component C) are used for the purpose, what is meant, for example, by $a_{min}=[(-1/3500 \cdot 50)+(65/3500)]=0.00429$ is that more than 0.00429 mol of acid equivalents is used per 100 g of component C). If, for example, acetic acid (molar mass=60.1 g/mol) is used here as component A), this means that, for every 100 g of component C), more than 0.00429 mol·60.1 g/mol/1=0.258 g of acetic acid is used. If, rather than acetic acid, maleic anhydride (molar mass=98.1 g/mol) is used, it is found that, for the same $a_{min}$ (=0.00429), for every 100 g of component C), more than 0.00429 mol·98.1 g/mol/2=0.210 g of maleic anhydride is used.

The figures for the percentages by weight of components A) to E) and F) to I) are the percentages by weight of the respective component based on the dry weight of the lignocellulose particles (component LCP-1 or component LCP-2). The dry weight of the lignocellulose particles here is always set to 100% by weight. The percentages by weight of components A) to E) and F) to I) add up to this 100% by weight. The dry weight of the lignocellulose particles is the weight of the lignocellulose particles minus the water present therein. It is also referred to by the German term atro (absolutely dry) weight. If components A) to E) and F) to I) comprise water, they are thus used, for example, in the form of aqueous solutions or emulsions, in which case the water is not taken into account in the weight figures. If, for example, 5 kg of 30% ammonium nitrate solution are used as component D) per 100 kg of lignocellulose particles (dry weight), the result is 1.5% by weight of ammonium nitrate. In the case of the amino resins (component C or G-1) and in the case of the phenolic resins (component G-1), the weight is based on the solids content. The solids content of amino resins or phenolic resins is determined by weighing 1 g of the resin into a weighing boat, drying it in a drying cabinet at 120° C.+/−2° C. for 2 hours and weighing the residue after equilibration to room temperature in a desiccator (Zeppenfeld, Grunwald, Klebstoffe in der Holz- und Möbelindustrie [Adhesives in the Wood and Furniture Industries], DRW Verlag, 2nd edition, 2005, page 286).

In addition, all layers comprise water, which is not taken into account in the weight figures.

The water may derive from the residual moisture present in the lignocellulose particles LCP-1) or LCP-2), from the binders B), C) or G-1), G-2) (for example when the isocyanate-containing binder is in the form of an aqueous emulsion or when aqueous amino resins are used), from additionally added water (for example for dilution of the binders or for moistening of the outer layers), from the additives E) or I) (for example aqueous paraffin emulsions) or from the hardeners D) or H) (for example aqueous ammonium salt solutions). The water content of the individual layers may be up to 20% by weight, i.e. 0% to 20% by weight, preferably 2% to 15% by weight and more preferably 4% to 10% by weight, based on 100% by weight of total dry weight. Preferably, the water content in the outer layers OL-A and OL-C is greater than in the core B.

The structure of the multilayer lignocellulose materials follows the following pattern:
 (A) outer layer (OL-A), the upper outer layer,
 (B) core (core B) and
 (C) outer layer (OL-C), the lower outer layer,
where the outer layers OL-A and OL-C may each be formed from one or more, i.e. 1 to 5, preferably 1 to 3, more preferably 1 to 2 layers and most preferably one layer of identical or different composition, and the compositions of outer layers OL-A and OL-C are the same or different, preferably the same.

The single-layer lignocellulose materials consist of just one layer corresponding to the core (core B), and do not have any outer layers OL-A and OL-C.

Preference is given to multilayer and very particular preference to three-layer lignocellulose materials, i.e. those that are formed from a core and one upper and one lower outer layer.

In addition to the outer layers, the multilayer lignocellulose material may comprise further outer "protective layers", preferably two further outer layers, i.e. an upper protective layer that adjoins the outer layer OL-A (in the case of one layer) or the uppermost of the upper outer layers OL-A (in the case of multiple layers), and a lower protective layer that adjoins the outer layer OL-C (in the case of one layer) or the lowermost of the lower outer layers OL-C (in the case of multiple layers), which have any desired composition.

These protective layers are much thinner than the outer layers. The mass ratio between protective layers and outer layers is less than 10:90, preferably less than 5:95. Most preferably, no protective layers are present.

The single-layer lignocellulose material may comprise outer protective layers in addition to the core B layer, preferably two further outer layers, i.e. an upper protective layer and a lower protective layer that adjoin the core B layer, which have any desired composition. The mass ratio between protective layers and core B is less than 5:95, preferably less than 2:98. Most preferably, no protective layers are present.

Suitable single-layer or multilayer lignocellulose materials are, for example, products in beam or board form such as beams or boards produced from lignocellulose particles, preferably products in board form such as boards produced from lignocellulose particles.

The process of the invention for production of lignocellulose materials comprises the following process steps:
 (Ia) producing the mixture of lignocellulose particles (component LCP-1) with the components for single-layer lignocellulose materials or for the core of multi-layer lignocellulose materials,
 (Ib) optionally producing the mixtures of lignocellulose particles (component LCP-2) with the components for the outer layers of multilayer lignocellulose materials,
 (II) scattering the mixture(s) produced in process steps (Ia) and optionally (Ib) to give a mat,
 (III) optionally precompacting the scattered mat and
 (IV) hot pressing the optionally precompacted mat.

Components which may also be 0% by weight are only optionally present in the lignocellulose materials or in the mixtures described therein.

The process of the invention can be performed as follows:
Process steps (Ia) and (Ib)—production of the mixtures for the individual layers:

Components LCP-1), A), B), C), D) and E) (composition of the core) and optionally components LCP-2), F), G-1), G-2), H), and I) (composition of the outer layers) are mixed in separate mixing operations, generally by initially charging the lignocellulose particles in each case [component LCP-1) or, as the case may be, component LCP-2)] and adding the rest of the components A), B), C), D) and E) or, as the case may be, F), G-1), G-2), H) and I), in any desired sequence.

It is also possible to use mixtures of the individual components A), B), C), D) and E), i.e., for example, to mix components D) and E) before the two components together are mixed into the lignocellulose particles LCP-1). Components A), B), C), D) and E) can be divided into portions and these portions can be mixed into the lignocellulose particles LCP-1) individually at different times or in a mixture. If the component which is being divided into portions consists of two or more different substances, the individual portions may have different compositions. These options also exist analogously in the case of multilayer woodbase materials for components F), G-1), G-2), H) and I) in the outer layers.

In a preferred embodiment, only one mixture is produced for the outer layers and this mixture is divided for the two outer layers (OL-A and OL-C) in accordance with their weight ratio.

It is also possible that components LCP-1) and LCP-2) are composed of mixtures of different types of wood and/or particle sizes. In a preferred embodiment, in the case of multilayer woodbase materials, the mean particle sizes of component LCP-1) are greater than those of component LCP-2).

Process Step (Ia)—Production of Mixture M1

Component C), which has optionally been mixed in a separate step with one or more components selected from the groups of components B), D) and E), and component A) or the mixture of component A) with component B) [mixture AB)] or the mixture of component A) with component B) and component E) [mixture ABE)] can be added to the lignocellulose particles LCP-1) or to the mixture of lignocellulose particles LCP-1) with one or more components selected from the groups of components B), D) and E) either
(1) separately from one another or
(2) as a mixture,
preferably as a mixture.

(1) Separately from one Another

Addition separately from one another is understood here to mean that component C) [or the mixture of component C) with one or more components selected from the group of components B), D) and E)] and component A) or mixture AB) or mixture ABE) are added to the lignocellulose particles LCP-1) or to the mixture of lignocellulose particles LCP-1) with one or more components selected from the groups of components B), D) and E) with the aid of separate application devices, for example nozzles or applicator disks. The application devices may be arranged spatially in such a way or in such a time sequence that the addition of component C [or of the mixture of component C) with one or more components selected from the group of components B), D) and E)] and the addition of component A) or of mixture AB) or of mixture ABE) are effected successively, in any sequence. The application devices are preferably arranged such that component C) [or the mixture of component C) with one or more components selected from the group of components B), D) and E)] and component A) or mixture AB) or mixture ABE), preferably mixture AB) or mixture ABE), most preferably mixture AB), are added simultaneously to the lignocellulose particles LCP-1) or to the mixture of lignocellulose particles LCP-1) with one or more components selected from the groups of components B), D) and E). In general, this is achieved by virtue of the application devices being in immediate spatial proximity. In a preferred embodiment, the application devices may also be aligned here such that the components mix partly or completely even when they are on the way from the application devices to the lignocellulose particles LCP-1).

If component B) is both part of the mixture of component C) with one or more components selected from the group of components B), D) and E), i.e. part of mixture AB) or of mixture ABE), this should be understood to mean that a portion of B) is used in both mixtures. In addition, B) may also be used separately as a further portion (i.e. not as part of these two mixtures).

(2) As a Mixture

Addition as a mixture can be effected, for example, by feeding component C), or the mixture comprising component C), and component A) or the mixture comprising component A) or the mixture comprising component A) and component B), preferably the mixture comprising component A) and component B), from separate vessels to a mixing unit, for example mixing vessel or static mixer, and mixing them therein, and adding the mixture thus obtained to the lignocellulose particles LCP-1) or to the mixture of lignocellulose particles LCP-1) with one or more components selected from the groups of components B), D) and E) within from 0.1 to 3600 seconds, preferably 0.1 to 300 seconds, more preferably 0.1 to 60 seconds, especially 0.1 to 10 seconds and most preferably 0.1 to 2 seconds. The periods of time specified are based on the times from the contacting of component C) or of the mixture comprising component C) with component A) or the mixture comprising component A) or the mixture comprising component A) and component B) in the mixing unit until the contacting of the mixture comprising C) and A) produced in the mixing unit with the lignocellulose particles LCP-1). The addition of the mixture to the lignocellulose particles LCP-1) or to the mixture of lignocellulose particles LCP-1) with one or more components selected from the groups of components B), D) and E) can be effected with the aid of standard application devices, for example nozzles or applicator disks.

Components A), B), C), D) and E) can also be divided into portions. These portions can be added at different times and in blends with different components.

Embodiments for (1) separately from one another For example, an initial charge of component LCP-1) can be mixed with component C), and then the following can be added:
  component D) and then components A) and B) together or in any sequence, preferably together, and then component E), or
  component E) and then components A) and B) together or in any sequence, preferably together, and then component D), or
  components D) and E) together or in any sequence, and then component A) and component B) together or in any sequence, preferably together, or
  components A) and B) together or in any sequence, preferably together, and then components D) and E) together or in any sequence.

For example, an initial charge of component LCP-1) can be mixed with component C) and component D) together or in any sequence, and then the following can be added:
  component E) and then components A) and B), together or in any sequence, preferably together, or
  components A) and B), together or in any sequence, preferably together, and then component E).

For example, an initial charge of component LCP-1) can be mixed with component C), and then the following can be added:
  component D) and then component E) and a mixture of components A) and B), together or in any sequence, preferably together, or
  component E) and a mixture of components A) and B) together or in any sequence, preferably together, and then component D).

For example, an initial charge of component LCP-1) can be mixed with component C), and then the following can be added:
  component D) and a portion of component E), together or in any sequence, and then a further portion of component E) and a mixture of components A) and B), together or in any sequence, preferably together, or a portion of component E) and a mixture of components A) and B), together or in any sequence, preferably together, and then a further portion of component E) and component D), together or in any sequence.

For example, an initial charge of component LCP-1) can be mixed with component C) and component D) and a portion of component A), together or in any sequence, and then the following can be added:
component E) and then a further portion of component A) and component B), together or in any sequence, preferably together, or
a further portion of component A) and component B), together or in any sequence, preferably together, and then component E).

For example, an initial charge of component LCP-1) can be mixed with component E) and component C) together or in any sequence, and then the following can be added:
component D) and then components A) and B) together or in any sequence, preferably together, or
components A) and B) together or in any sequence, preferably together, and then component D).

For example, an initial charge of component LCP-1) can be mixed with component A) and component B) together or in any sequence, preferably together, and then the following can be added:
component E) and then components C) and D), together or in any sequence, preferably together, or
components C) and D), together or in any sequence, preferably together, and then component E).

For example, an initial charge of component LCP-1) can be mixed with component E), and then the following can be added:
component C) and component D) together or in any sequence, preferably together, and then components A) and B) together or in any sequence, preferably together, or
components A) and B) together or in any sequence, preferably together, and then component C) and component D) together or in any sequence.

For example, an initial charge of component LCP-1) can be mixed with component A) and a first portion of component B) together or in any sequence, preferably together, and then the following can be added:
component E) and then components C) and D), together or in any sequence, preferably together, or
components C) and D), together or in any sequence, preferably together, and then component E),
wherein the second portion of component B) is added at any time, preferably before or after, more preferably after, addition of component A) and of the first portion of B).

For example, an initial charge of component LCP-1) can be mixed with component E), and then the following can be added:
component C) and component D) together or in any sequence, preferably together, and then component A) and a first portion of component B) together or in any sequence, preferably together, or
component A) and a portion of component B) together or in any sequence, preferably together, and then component C) and component D) together or in any sequence,
wherein the second portion of component B) is added at any time, preferably before or after, more preferably after, addition of component A) and of the first portion of B).

Preferably, an initial charge of component LCP-1) is mixed with component C) and component D) together or in any sequence, and then the following are added:
component E) and then components A) and B), together or in any sequence, preferably together, or
components A) and B), together or in any sequence, preferably together, and then component E).

Further preferably, an initial charge of component LCP-1) is mixed with component A) and component B) together or in any sequence, preferably together, and then the following are added:
component E) and then components C) and D), together or in any sequence, preferably together, or
components C) and D), together or in any sequence, preferably together, and then component E).

Further preferably, an initial charge of component LCP-1) is mixed with component E), and then the following are added:
component C) and component D) together or in any sequence, preferably together, and then components A) and B) together or in any sequence, preferably together, or
components A) and B) together or in any sequence, preferably together, and then component C) and component D) together or in any sequence.

Embodiments for (2) as a mixture

For example, an initial charge of component LCP-1) can be mixed with component E), and then a mixture of components A), B), C) and D) can be added.

For example, an initial charge of component LCP-1) can be mixed with a mixture of components A), B), C) and D), and then component E) can be added.

For example, an initial charge of component LCP-1) can be mixed with a portion of component E), and then a mixture of a further portion of component E) and components A), B), C) and D) can be added.

For example, an initial charge of component LCP-1) can be mixed with a mixture of a portion of component E) and components A), B), C) and D), and then a further portion of component E) can be added.

For example, an initial charge of component LCP-1) can be mixed with a mixture of component C) and component A), and then the following can be added:
component B), and then
components D) and E) together or in any sequence.

For example, an initial charge of component LCP-1) can be mixed with a mixture of components A), C) and D), and then components B) and E) can be added, together or in any sequence.

For example, an initial charge of component LCP-1) can be mixed with a mixture of components A), B) and C), and then components D) and E) can be added, together or in any sequence.

For example, an initial charge of component LCP-1) can be mixed with components D) and E), together or in any sequence, and then a mixture of components A), B) and C) can be added.

For example, an initial charge of component LCP-1) can be mixed with component D), and then a mixture of components A), B) and C) and then component E) can be added.

For example, an initial charge of component LCP-1) can be mixed with component E), and then a mixture of components A), B) and C) and then component D) can be added.

For example, an initial charge of component LCP-1) can be mixed with a mixture of a first portion of component B) with components A) and C), and then components D) and E) can be added, together or in any sequence, where a second portion of component B) is added at any time, preferably prior to the addition of components D) and E).

For example, an initial charge of component LCP-1) can be mixed with components D) and E), together or in any sequence, and then a mixture of a first portion of component B) with components A) and C) can be added, where a second portion of component B) is added at any time, preferably after the addition of components D) and E).

For example, an initial charge of component LCP-1) can be mixed with component D), then a mixture of a first portion of component B) with components A) and C), and then component E) can be added, where a second portion of component B) is added at any time, preferably prior to the addition of E).

For example, an initial charge of component LCP-1) can be mixed with component E), then a mixture of a first portion of component B) with components A) and C), and then component D) can be added, where a second portion of component B) is added at any time, preferably prior to the addition of component D).

For example, an initial charge of component LCP-1) can be mixed with a mixture of components A), C) and D), and then components B) and E) can be added, together or in any sequence.

In a preferred embodiment, an initial charge of component LCP-1) can be mixed with component E), and then a mixture of components A), B), C) and D) can be added.

In a further preferred embodiment, an initial charge of component LCP-1) can be mixed with a mixture of components A), B), C) and D), and then component E) can be added.

In a further preferred embodiment, an initial charge of component LCP-1) can be mixed with a portion of component E), and then a mixture of a further portion of component E) and components A), B), C) and D) can be added.

In a further preferred embodiment, an initial charge of component LCP-1) can be mixed with a mixture of a portion of component E) and components A), B), C) and D), and then a further portion of component E) can be added.

Process step (Ib)—preparation of one or more mixtures M2

Component G-1), which has optionally been mixed in a separate step with one or more components selected from the groups of components G-2), H) and I), and component F) or the mixture of components F) and G-2) or the mixture of components F), G-2) and I) can be added to the lignocellulose particles LCP-2) or to the mixture of lignocellulose particles LCP-2) with one or more components selected from the groups of components B), D) and E) either
(1) separately from one another or
(2) as a mixture,
preferably as a mixture.

What is meant by (1) separately from one another and (2) as a mixture has already been elucidated for the mixture of component C) [or mixture comprising C)] and component A) or mixtures of components A) and B) or A), B) and E) and is correspondingly applicable here.

Components F), G-1), G-2), H) and I) can also be divided into portions. These portions can be added at different times and in blend(s) with different components.

For example, an initial charge of component LCP-2) can be mixed with component G) (here and hereinafter, component G) means: component G-1) or components G-1) and G-2) together or in any sequence), and then the following can be added:
component H) and then component F) and then component I) or
a mixture of components H) and I) together or in any sequence, preferably first component H) and then component I), then component F) or
a mixture of F) and H) together or in any sequence and then component I).

For example, an initial charge of component LCP-2) can be mixed with component G) and component H) together or in any sequence, and then the following can be added:
component F) and then component I) or
component I) and then component F).

For example, an initial charge of component LCP-2) can be mixed with component I), then with component G), and then the following can be added:
component H) and then component F) or
a mixture of components F) and H) together or in any sequence, preferably first component F) and then component H), or
a mixture of F) and H) together or in any sequence.

For example, the following can be added to an initial charge of component LCP-2):
component F) and then components G), H), I) together or in any sequence, preferably as a joint mixture, or
components G), H) and I) together or in any sequence, preferably as a joint mixture, and then component F).

More preferably, an initial charge of LCP-2) is mixed with a mixture of components G) and H) together or in any sequence and then with component F) and then with component I), or an initial charge of LCP-2) is mixed with a mixture of components G), H) and I) together or in any sequence and then with component G, or an initial charge of LCP-2) is mixed with component F) and then with a mixture of components G), H) and I) together or in any sequence.

The mixing of components A) to E) with component LCP-1) or of F) to I) with component LCP-2) can be effected by the methods known in the woodbase materials industry, as described, for example, in M. Dunky, P. Niemz, Holzwerkstoffe und Leime [Woodbase Materials and Glues], pages 118 to 119 and page 145, Springer Verlag Heidelberg, 2002.

The mixing can by spray application of the components or mixtures of the components onto the lignocellulose particles in apparatuses such as high-speed ring mixers with addition of glue via a hollow shaft (inner gluing) or high-speed ring mixers with addition of glue from the outside via nozzles (outer gluing).

If lignocellulose fibers are used as component LCP-1) or LCP-2), the spray application can also be effected in the blowline downstream of the refiner.

If lignocellulose strands are used as component LCP-1) or LCP-2), the spray application is generally effected in low-speed mixers of large volume.

The mixing can also be effected by spray application in a freefall duct as described, for example, in DE-A-10 247 412 or DE-A-10 104 047, or by spraying of a curtain of lignocellulose particles as implemented in the Evojet methodology of Dieffenbacher GmbH.

Process step (II)—scattering the mixture(s) produced in process step (I) to give a mat For the single-layer lignocellulose material, the mixture of LCP-1), A), B), C), D) and E) obtained is scattered to form a mat.

For the multilayer lignocellulose material, the mixtures of components LCP-1), A), B), C), D) and E) obtained and the mixtures of components LCP-2), F), G), H) and I) are scattered one on top of another to form a mat, so as to give the inventive construction of the multilayer lignocellulose materials [according to the pattern (A), (B), (C)]. This is generally done by scattering the lower outer layer(s), beginning with the outermost outer layer and as far as the lower outer layer closest to the core, the core layer thereon, and then the upper outer layers, beginning with the upper outer layer closest to the core and as far as the outermost outer layer. Preference is given to scattering a lower outer layer, the core layer thereon, and then an upper outer layer. The core layer can be scattered in one or more steps, preferably in two steps.

In general, scattering is effected in such a way that the mass of mixture M1 used for the core is greater per unit mat area than the mass of the mixture(s) M2 used for the outer layers. The total mass of mixture M1 and M2 per unit mass area is found on the basis of the desired thickness and density of the lignocellulose material.

If the single-layer or multilayer lignocellulose layers are to contain additional protective layers, the material mixtures needed for the formation of these protective layers are each scattered as the lowermost and the uppermost layer in the mat.

In general, the mixtures are scattered directly onto a substrate, for example onto a molding belt.

The scattering can be conducted by methods known per se, such as mechanical scattering or pneumatic scattering, or, for example, with roll systems (see, for example, M. Dunky, P. Niemz, Holzwerkstoffe und Leime, pages 119 to 121, Springer Verlag Heidelberg, 2002), in a batchwise or continuous manner, preferably continuously.

Between process step (Ia) and process step (II), i.e. from the completion of mixture M1 to the start of the scattering, there may be a period of 3 to 60 minutes, preferably 4 to 45 minutes, more preferably 5 to 25 minutes. Within this period, mixture M1 is transported, for example, from a mixing unit to a scattering apparatus. The mixture may also be intermediately stored, for example in a scattering bunker. In a continuous process, the times specified should be regarded as average dwell times. The temperature of mixture M1 may change within this period of time. In general, the change in temperature is less than 10° C., preferably less than 5° C., more preferably less than 3° C.

Process step (III)—optionally precompacting the scattered mat

The scattering of each individual layer may be followed by a preliminary compaction. In the case of the multilayer lignocellulose materials, the scattering of each individual layer may generally be followed by a preliminary compaction, preference being given to conducting the preliminary compaction after the scattering of all layers one on top of another.

The preliminary compaction can be effected by methods known to those skilled in the art, as described, for example, in M. Dunky, P. Niemz, Holzwerkstoffe und Leime, Springer Verlag Heidelberg, 2002, page 819 or in H.-J, Deppe, K. Ernst, MDF—Mitteldichte Faserplatte [Medium-Density Fiberboard], DRW-Verlag, 1996, pages 44, 45 and 93 or in A. Wagenführ, F. Scholz, Taschenbuch der Holztechnik [Handbook of Wood Technology], Fachbuchverlag Leipzig, 2012, page 219.

During or after the preliminary compaction and prior to process step (IV), energy can be introduced into the mat in a preheating step with one or more energy sources of any kind. Suitable energy sources are hot air, steam, steam/air mixtures, or electrical energy (high-frequency high-voltage field or microwaves). This heats the mat within the core to 40 to 130° C., preferably to 50 to 100° C., more preferably to 55 to 75° C. The preheating with steam and steam/air mixtures in the case of multilayer lignocellulose materials can also be conducted in such a way that only the outer layers are heated, but the core is not. Preferably, the core and the outer layers are heated even in the case of multilayer lignocellulose materials.

If the preliminary compaction is followed by preheating, expansion of the mat during heating can be prevented by conducting the heating operation in a space delimited in the upward and downward direction. The design of the delimiting surfaces here is such as to permit introduction of energy. By way of example, it is possible to use perforated plastics belts or steel nets which are permeable to hot air, steam, or steam-air mixtures. The design of the delimiting surfaces is optionally such that they exert a pressure on the mat, said pressure being sufficiently great to prevent expansion during heating.

In general, the preliminary compaction is not followed by preheating, meaning that the scattered mat after process step (III) is at a lower temperature than or has, the same temperature as before process step (III).

The compaction can be effected in one, two or more steps.

The process of the invention can also be conducted without preliminary compaction. However, preliminary compaction preferably does take place.

The preliminary compaction is generally effected at a pressure of 1 to 30 bar, preferably 2 to 25 bar and more preferably 3 to 20 bar.

Between the start of process step (II) and the start of process step (III), i.e. from the beginning of scattering to the beginning of preliminary compaction, there may, for example, be a period of time of 1 to 120 seconds, preferably 2 to 60 seconds, more preferably 3 to 20 seconds.

Process step (IV)—hot pressing the optionally precompacted mat

In process step (IV), the thickness of the mat is reduced (further) by applying a pressure. This involves increasing the temperature of the mat by introducing energy. In the simplest case, a constant pressure is applied and, at the same time, heating is effected by means of an energy source at constant power. Alternatively, both the introduction of energy and compaction by means of pressure can each be effected at different times and in two or more stages. The energy input in process step (IV) is generally effected
  a) by applying a high-frequency electrical field and/or
  b) by hot pressing, i.e. by means of heat transfer from heated surfaces, for example press plates, to the mat during the pressing operation,
preferably b) by hot pressing.

a) Energy Input by Applying a High-Frequency Electrical Field

In the input of energy by application of a high-frequency electrical field, the mat is heated such that, after the high-frequency electrical field has been switched off, in process step (IV), the layer of the core is at a temperature of more than 90° C.

When the high-frequency electrical field is switched off, the temperature in the core is at least 90° C., i.e. 90 to 170° C., preferably at least 100° C., i.e. 100 to 170° C., more preferably at least 110° C., i.e. 110 to 170° C., especially at least 120° C., i.e. 120 to 170° C.

The high-frequency electrical field applied may be microwave radiation or a high-frequency electrical field which arises between the two capacitor plates after application of a high-frequency AC voltage field to a plate capacitor.

In a preferred embodiment, a compaction step can be conducted first, and then heating by application of a high-frequency AC voltage field.

For this purpose, the scattered and compacted mat can be conducted through a region between plate capacitors arranged in parallel by means of a conveyor belt.

An apparatus for a continuous process in order to implement the heating by means of application of a high-frequency electrical field after the compaction within the same machine is described, for example, in WO-A-97/28936.

The heating immediately after the compaction step can also be effected in a batchwise high-frequency press, for example in a high-frequency press, for example in the HLOP 170 press from Hoefer Presstechnik GmbH.

If the heating follows the compaction, expansion of the mat during heating can be suppressed, minimized or prevented by conducting the heating operation in a space delimited in the upward and downward direction. The design of the delimiting surfaces here is such as to permit introduction of energy. The design of the delimiting surfaces is optionally such that they exert a pressure on the mat, said pressure being sufficiently great to prevent expansion during heating.

In a particular embodiment, for a continuous process, these delimiting surfaces are press belts that are driven by rollers. Beyond these press belts are disposed the capacitor plates. The mat is guided here through a pair of capacitor plates, with one press belt between the mat and upper capacitor plate and the other press belt between the mat and lower capacitor plate. One of the two capacitor plates may be grounded, such that the high-frequency heating works by the principle of unsymmetric feeding.

In the multilayer lignocellulose materials, the outer layers OL-A and OL-C may have a different temperature than the core B after process step (IV). In general, the temperature differential is between 0 and 50° C.

b) Energy Input by Hot Pressing

Energy input by hot pressing is typically effected by contact with heated press surfaces having temperatures of 80 to 300° C., preferably 120 to 280° C., more preferably 150 to 250° C., with pressing being effected during the energy input at a pressure of 1 to 50 bar, preferably 3 to 40 bar, more preferably 5 to 30 bar. Pressing can be effected here by any methods known to those skilled in the art (see examples in "Taschenbuch der Spanplatten Technik" [Handbook of fiberboard Technology], H.-J. Deppe, K. Ernst, 4th ed., 2000, DRW—Verlag Weinbrenner, Leinfelden Echterdingen, pages 232 to 254, and "MDF—Mitteldichte Faserplatten" H.-J. Deppe, K. Ernst, 1996, DRW—Verlag Weinbrenner, Leinfelden-Echterdingen, pages 93 to 104). Preference is given to using continuous pressing methods, for example with twin belt presses. The pressing time is normally 2 to 15 seconds per mm of board thickness, preferably 2 to 10 seconds, more preferably 2 to 6 seconds, especially 2 to 4 seconds.

If the energy input in process step (IV) is effected by a) applying a high-frequency electrical field and by b) hot pressing, preference is then given to executing first step a) and then step b).

Between the start of process step (II) and the start of process step (IV), i.e. from the beginning of scattering to the beginning of hot pressing, there may, for example, be a period of time of 5 to 300 seconds, preferably 7 to 120 seconds, more preferably 10 to 60 seconds.

The components of the core LCP-1), A), B), C), D) and E) and the components of the outer layers LCP-2), F), G-1), G-2), H) and I) have the definitions which follow.

Components LCP-1) and LCP-2):

A suitable raw material for the lignocellulose particles LCP-1) and LCP-2) is any desired type of wood or a mixture of these, for example wood from spruce, beech, pine, larch, lime, poplar, eucalyptus, ash, chestnut or fir or a mixture of these, preferably wood from spruce or beech or a mixture of these, in particular wood from spruce, and it is possible by way of example to use wood entities such as wood plies, wood strands, wood particles, wood fibers, wood dust or a mixture of these, preferably wood particles, wood fibers, wood dust or a mixture of these, more preferably wood particles, wood fibers or a mixture of these—as used for the production of particleboard, MDF (medium-density fiberboard) and HDF (high-density fiberboard)—most preferably wood particles. The lignocellulose particles can also derive from woody plants such as flax, hemp, cereal or other annual plants, preferably from flax or hemp. It is particularly preferable to use wood particles as used in the production of particleboard.

Starting materials for the lignocellulose particles are usually roundwood, lumber from forest-thinning, wood residues, waste lumber, industrial wood wastes, used wood, wastes from production of woodbase materials, used woodbase materials, and also lignocellulose-containing plants. Processes known per se can be used for treatment to give the desired lignocellulose-containing particles, for example wood particles or wood fibers (e.g. M. Dunky, P. Niemz, Holzwerkstoffe und Leime, pages 91-156, Springer Verlag Heidelberg, 2002).

The size of the lignocellulose particles may be varied within wide limits and can fluctuate within wide limits.

If the lignocellulose particles LCP-1) and LCP-2) are lignocellulose fibers, the volume-weighted average fiber length of component LCP-2) of the outer layers is then preferably smaller than or equal to, more preferably smaller than, the volume-weighted average fiber length of component LCP-1) in the core of the multilayer lignocellulose materials. The ratio of the volume-weighted average fiber lengths ($\bar{x}_{dimension}$) of component LCP-2) to the volume-weighted average fiber lengths ($\bar{x}_{dimenson}$) of component LCP-1) can be varied within wide limits and is generally 0.1:1 to 1:1, preferably 0.5:1 to 1:1, more preferably 0.8:1 to 1:1.

The volume-weighted average fiber length ($\bar{x}_{dimension}$) of component LCP-1) is generally 0.1 to 20 mm, preferably 0.2 to 10 mm, more preferably 0.3 to 8 mm, most preferably 0.4 to 6 mm.

The volume-weighted average fiber length $\bar{x}_{dimension}$ is determined by means of digital image analysis. An example of an instrument that can be used is a Camsizer® from Retsch Technology. The procedure here is that $X_{dimension}$ is determined for each individual fiber of a representative sample. $x_{dimension}$ is calculated from the area of the particle projection A and the Martin diameter $x_{Ma\_min}$. The applicable equation here is $x_{dimension} = x_{Ma\_min}/A$. The volume-weighted average value $\bar{x}_{dimension}$ is calculated from the individual values. The measurement method and the evaluation method are described in the Camsizer manual (Operating instructions/Manual for CAMSIZER® grain-size measurement system, Retsch Technology GmbH, version 0445.506, release 002, revision 009 of 06.25.2010).

If the lignocellulose particles LCP-1) and LCP-2) are lignocellulose strands or lignocellulose particles, the volume-weighted average particle diameter of component LCP-2) of the outer layers is then preferably smaller than or equal to, more preferably smaller than, the volume-weighted average particle diameter of component LCP-1) in the core of the multilayer lignocellulose materials. The ratio of the volume-weighted average particle diameter $\bar{x}_{Fe\_max}$ of component LCP-2) to the volume-weighted average particle diameter $\bar{x}_{Fe\ max}$ of component LCP-1) can be varied within wide limits and is generally 0.01:1 to 1:1, preferably 0.1:1 to 0.95:1, more preferably 0.5:1 to 0.9:1.

The volume-weighted average particle diameter $\bar{x}_{Fe\ max}$ of component LCP-1) is generally 0.5 to 100 mm, preferably 1 to 50 mm, more preferably 2 to 30 mm, most preferably 3 to 20 mm.

The volume-weighted average particle diameter $\bar{x}_{Fe\ max}$ is determined by means of digital image analysis. An example of an instrument that can be used is a Camsizer® from Retsch Technology. The procedure here is that $x_{Fe\ max}$ is determined for each individual lignocellulose strand or each individual lignocellulose particle of a representative sample. $X_{Fe\ max}$ is the largest Feret diameter of a particle (determined from various measurement directions). The volume-weighted average value $\bar{x}_{Fe\ max}$ is calculated from the individual values. The measurement method and the evaluation method are described in the Camsizer manual (Operating instructions/Manual for CAMSIZER® grain-size measurement system, Retsch Technology GmbH, version 0445.506, release 002, revision 009 of 06.25. 2010).

If mixtures of wood particles and other lignocellulose particles are used, for example mixtures of wood particles and wood fibers, or of wood particles and wood dust, the proportion of wood particles in component LCP-1) and in component LCP-2) is generally at least 50% by weight, i.e. 50% to 100% by weight, preferably at least 75% by weight, i.e. 75% to 100% by weight, more preferably at least 90% by weight, i.e. 90% to 100% by weight.

The average densities of components LCP-1) and LCP-2) are independently generally 0.4 to 0.85 g/cm³, preferably 0.4 to 0.75 g/cm³, especially 0.4 to 0.6 g/cm³. These figures are based on the standard apparent density after storage under standard climatic conditions (20° C., 65% air humidity).

Components LCP-1) and LCP-2) may independently comprise the customary small amounts of water of 0% to 10% by weight, preferably 0.5% to 8% by weight, more preferably 1% to 5% by weight (within a conventional small variation range of 0% to 0.5% by weight, preferably 0% to 0.4% by weight, more preferably 0% to 0.3% by weight). These figures are based on 100% by weight of absolutely dry wood matter and describe the water content of components LCP-1) and LCP-2) after drying (by customary methods known to those skilled in the art) prior to the application of components A) to E) or F) to I) mixing with other components.

In a further preferred embodiment, lignocellulose fibers are used as lignocellulose particles LCP-2) for the outer layers, and lignocellulose strands or lignocellulose particles as lignocellulose particles LCP-1) for the core, more preferably lignocellulose particles, especially lignocellulose particles with a volume-weighted average particle diameter $\bar{x}_{Fe\ max}$ of 2 to 30 mm.

Component LCP-1) may also comprise 0% to 20% by weight, preferably 0% to 10% by weight, more preferably 0% to 5% by weight, most preferably 0% by weight, of lightweight fillers, for example cork granules, popcorn or expanded polymer particles.

The percentages by weight in this case mean the proportion of lightweight filler (dry weight) in the total dry weight of component LCP-1). 10% by weight of lightweight filler accordingly means that component LCP-1), based on the dry weights, comprises 10% by weight of lightweight filler and 90% by weight of lignocellulose particles (as described above). The reference parameter for the percentages by weight of the other components A) to E) remains 100% by weight.

Popcorn is understood here to mean foamlike materials produced from different plant seeds, e.g. wheat grains, by abrupt evaporation of the water present therein. Typical starting materials for this purpose are amaranth, quinoa, rice, wheat and corn grains.

Suitable expanded polymer particles for the component are expanded polymer particles, preferably expanded polymer particles, expanded thermoplastic polymer particles with a bulk density of 10 to 150 kg/m³, preferably 30 to 130 kg/m³, more preferably 35 to 110 kg/m³ and especially 40 to 100 kg/m³ (determined by weighing of a defined volume filled with the particles).

Expanded polymer particles for component B) are generally used in the form of spheres or beads with an average diameter of 0.01 to 50 mm, preferably 0.25 to 10 mm, more preferably 0.4 to 8.5 mm and especially 0.4 to 7 mm. In a preferred embodiment, the beads have a small surface area per unit volume, for example taking the form of a spherical or elliptical particle, and are advantageously closed-cell. The open-cell factor in accordance with DIN ISO 4590 is generally not more than 30%, i.e. 0% to 30%, preferably 1% to 25% and more preferably 5% to 15%.

Suitable polymers on which the expanded polymer particles are based are generally all the known polymers and mixtures of these, preferably thermoplastic polymers and mixtures of these, that are foamable. Examples of polymers of this type having good suitability are polyketones, polysulfones, polyoxymethylene, PVC (rigid and flexible), polycarbonates, polyisocyanurates, polycarbodiimides, polyacrylimides and polymethacrylimides, polyamides, polyurethanes, amino resins and phenolic resins, styrene homopolymers (also termed "polystyrene" or "styrene polymer" below), styrene copolymers, $C_2$- to $C_{10}$-olefin homopolymers, $C_2$- to $C_{10}$-olefin copolymers and polyesters. The olefin polymers mentioned are preferably prepared by using 1-alkenes, for example ethylene, propylene, 1-butene, 1-hexene, 1-octene.

It is additionally possible to add conventional additives to the polymers, preferably the thermoplastics, on which the expandable or expanded polymer particles of component B) are based, examples being UV stabilizers, antioxidants, coating agents, hydrophobizing agents, nucleating agents, plasticizers, flame retardants, and soluble and insoluble inorganic and/or organic dyes.

If an expandable medium (also termed "blowing agent") is used with suitable polymers, or if suitable polymers comprise an expandable medium, they can be expanded (another term often used being "foamed") via exposure to microwave energy, heat, hot air, or preferably steam, and/or a pressure change (Kunststoff Handbuch [Plastics Handbook] 1996, vol. 4 "Polystyrol" [Polystyrene], Hanser 1996, pages 640-673 or U.S. Pat. No. 5,112,875). The general procedure here is that the blowing agent expands and the size of the particles increases, and cell structures arise. This expansion can be carried out in conventional foaming devices, often termed "prefoamers". The expansion can be single-stage or multistage expansion. The general procedure in the single-stage process is that the expandable polymer particles are simply expanded to the desired final size. The general procedure in the multistage process is that the expandable polymer particles are first expanded to an intermediate size and then are expanded in one or more further stages by way of an appropriate number of intermediate sizes to the desired final size.

Any of the blowing agents known to the person skilled in the art can be used for the expansion of the expandable polymer particles, examples being aliphatic $C_3$ to $C_{10}$ hydrocarbons, for example propane, n-butane, isobutane, n-pentane, isopentane, neopentane, cyclopentane and/or hexane and its isomers, alcohols, ketones, esters, ethers or halogenated hydrocarbons, preferably n-pentane, isopentane, neopentane and cyclopentane, more preferably a commercially available pentane isomer mixture made of n-pentane and isopentane.

In a preferred embodiment, styrene homopolymer (also simply called "polystyrene" herein), styrene copolymer or a mixture of these is used.

The expandable polystyrene or expandable styrene copolymer, or the expanded polystyrene or expanded styrene copolymer, typically has an antistatic coating.

Before or during the foaming, it is possible to add pigments and particles, such as carbon black, graphite or aluminum powder, as added substances to the polymer from which the expanded polymer particles are produced.

Components C) and G-1):

The total amount of the binders of component C), based on the dry weight of the component LCP-1, is in the range from 5% to 15% by weight, preferably 6% to 13% by weight, more preferably 7% to 11% by weight.

The total amount of the binder of component G-1), based on the dry weight of the component LCP-2, is in the range from 1% to 30% by weight, preferably 2% to 20% by weight, more preferably 3% to 15% by weight.

The binders of component C) are selected from the group of the amino resins.

The binders of component G-1) may be selected from the group consisting of amino resin, phenolic resin, protein-based binder and other polymer-based binder.

Components G-1) used may be identical or different binders or binder mixtures of components G-1), preferably identical binders, more preferably amino resin in both cases.

The percentage by weight in the case of amino resins, phenolic resins, protein-based binders and the other polymer-based binders is based on the solids content of the corresponding component (determined by evaporating the water at 120° C. within 2 h in accordance with Günter Zeppenfeld, Dirk Grunwald, Klebstoffe in der Holz- und Möbelindustrie, 2nd edition, DRW-Verlag, page 268).

Phenolic Resin

Phenolics are synthetic resins which are obtained by condensation of phenols with aldehydes and can optionally be modified. As well as unsubstituted phenol, it is also possible to use phenol derivatives for the preparation of phenolics. These derivatives may be cresols, xylenols or other alkylphenols, for example p-tert-butylphenol, p-tert-octylphenol and p-tert-nonylphenol, arylphenols, for example phenylphenol and naphthols, or divalent phenols, for example resorcinol and bisphenol A. The most important aldehyde for the preparation of phenolics is formaldehyde, which can be used in different forms, for example as an aqueous solution, or in solid form as paraformaldehyde, or as a formaldehyde-releasing substance. Other aldehydes, for example acetaldehyde, acrolein, benzaldehyde or furfural, and ketones, can also be used. Phenolics can be modified by chemical reactions of the methylol groups or of the phenolic hydroxyl groups and/or by physical dispersion in a modifying agent (EN ISO 10082).

Preferred phenolics are phenol-aldehyde resins; particularly preferred phenol-formaldehyde resins (also called "PF resins") are known, for example, from Kunststoff-Handbuch, 2nd edition, Hanser 1988, volume 10 "Duroplaste" [Thermosets], pages 12 to 40.

Amino Resin

Amino resins used may be any of the amino resins known to the person skilled in the art, preferably those for the production of woodbase materials. These resins and the production thereof are described by way of example in Ullmanns Enzyklopädie der technischen Chemie [Ullmann's Encyclopedia of Industrial Chemistry], 4th revised and extended edition, Verlag Chemie, 1973, pages 403-424 "Aminoplaste" [Amino Resins] and Ullmann's Encyclopedia of Industrial Chemistry, vol. A2, VCH Verlagsgesellschaft, 1985, pages 115-141 "Amino Resins" and also in M. Dunky, P. Niemz, Holzwerkstoffe und Leime, Springer 2002, pages 251-259 (UF resins) and pages 303-313 (MUF and UF with a small amount of melamine). These are generally polycondensates of compounds having at least one carbamide group or amino group, optionally to some extent substituted by organic moieties (another term for the carbamide group being carboxamide group), preferably carbamide group, preferably urea or melamine, and of an aldehyde, preferably formaldehyde. Preferred polycondensates are urea-formaldehyde resins (UF resins), melamine-formaldehyde resins (MF resins) and melamine-containing urea-formaldehyde resins (MUF resins), with particular preference urea-formaldehyde resins, for example Kaurit® glue products from BASF SE.

Particular preference is given to urea-formaldehyde resins (UF resins) and melamine-containing urea-formaldehyde resins (MUF resins) in which the molar ratio of formaldehyde to $NH_2$ group (from urea and melamine) is in the range from 0.3:1 to 1:1, preferably 0.3:1 to 0.6:1, more preferably 0.3:1 to 0.55:1, most preferably 0.3:1 to 0.5:1. The amino resins mentioned are typically used in liquid form, typically as a solution of strength 25% to 90% by weight, preferably 50% by weight to 70% by weight, preferably in aqueous solution or suspension. The pH values of these aqueous amino resins are generally between 6.5 and 9.5, preferably between 7.0 and 9.0, more preferably between 7.2 and 8.8.

The solids content of the liquid aqueous amino resin can be determined in accordance with Günter Zeppenfeld, Dirk Grunwald, Klebstoffe in der Holz- und Möbelindustrie, 2nd edition, DRW-Verlag, page 268.

Protein-Based Binders

Examples of suitable protein-based binders are casein glues, animal glues, and blood albumin glues. It is also possible to use binders where alkaline-hydrolyzed proteins are used as binder constituent. Binders of this type are described in M. Dunky, P. Niemz, Holzwerkstoffe und Leime, Springer 2002, pages 415 to 417.

Soya protein-based binders are particularly suitable. These binders are typically produced from soya flour. The soya flour can optionally be modified. The soya-based binder can take the form of a dispersion. It comprises various functional groups, for example lysine, histidine, arginine, tyrosine, tryptophan, serine and/or cysteine. In one particular embodiment, the soya protein is copolymerized, for example with phenolic resin, urea resin, or PMDI. In a very particular embodiment, the soya-based binder is composed of a combination of a polyamidoepichlorohydrin resin (PAE) with a soya-based binder. An example of a suitable binder is the commercially obtainable binder system Hercules® PTV D-41080 Resin (PAE resin) and PTV D-40999 (soya component).

Other Polymer-Based Binders

Suitable polymer-based binders are aqueous binders which comprise a polymer N composed of the following monomers:
- a) 70% to 100% by weight of at least one ethylenically unsaturated mono- and/or dicarboxylic acid (monomer(s) $N_1$) and
- b) 0% to 30% by weight of at least one other ethylenically unsaturated monomer which differs from the monomers $N_1$ (monomer(s) $N_2$), and optionally a low-molecular-weight crosslinking agent having at least two functional groups selected from the group of hydroxy, carboxylic acid and derivatives thereof, primary, secondary, and tertiary amine, epoxy, and aldehyde.

The production of polymers N is familiar to the person skilled in the art and in particular is achieved via free-radical-initiated solution polymerization for example in water or in an organic solvent (see by way of example A. Echte, Handbuch der Technischen Polymerchemie [Handbook of Industrial Polymer Chemistry], chapter 6, VCH, Weinheim, 1993 or B. Vollmert, Grundriss der Makromolekularen Chemie [Principles of Macromolecular Chemistry], vol. 1, E. Vollmert Verlag, Karlsruhe, 1988).

Useful monomers $N_1$ especially include α,β-monoethylenically unsaturated mono- and dicarboxylic acids having from 3 to 6 carbon atoms, possible anhydrides of these, and also water-soluble salts of these, in particular alkali metal salts of these, examples being acrylic acid, methacrylic acid, maleic acid, fumaric acid, itaconic acid, citraconic acid, tetrahydrophthalic acid, and anhydrides of these, for example maleic anhydride, and also the sodium or potassium salts of the abovementioned acids. Particular preference is given to acrylic acid, methacrylic acid, and/or maleic anhydride, and particular preference is given here to acrylic acid and to the double combinations of acrylic acid and maleic anhydride, or acrylic acid and maleic acid.

Useful monomer(s) $N_2$ especially include ethylenically unsaturated compounds that are easily copolymerizable by a free-radical route with monomer(s) $N_1$, for example ethylene, $C_3$- to $C_{24}$-α-olefins, such as propene, 1-hexene, 1-octene, 1-decene; vinylaromatic monomers, such as styrene, α-methylstyrene, o-chlorostyrene, or vinyltoluenes; vinyl halides, such as vinyl chloride or vinylidene chloride; esters derived from vinyl alcohol and from monocarboxylic acids having from 1 to 18 carbon atoms, for example vinyl acetate, vinyl propionate, vinyl n-butyrate, vinyl laurate, and vinyl stearate; esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having from 1 to 12, preferably from 1 to 8, and in particular from 1 to 4, carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid; nitriles of α,β-monoethylenically unsaturated carboxylic acids, for example acrylonitrile, methacrylonitrile, fumaronitrile, maleonitrile, and also $C_4$- to $C_8$-conjugated dienes, such as 1,3-butadiene and isoprene. The monomers mentioned generally form the main monomers, and these combine to form a proportion of >50% by weight, preferably >80% by weight, and more preferably >90% by weight, based on the entirety of the monomers $N_2$, or indeed form the entirety of the monomers $N_2$. The solubility of these monomers in water under standard conditions (20° C., 1 atm (absolute)) is very generally only moderate to low.

Other monomers $N_2$, which, however, have higher water solubility under the abovementioned conditions, are those comprising either at least one sulfonic acid group and/or anion corresponding thereto or at least one amino, amido, ureido, or N-heterocyclic group, and/or nitrogen-protonated or -alkylated ammonium derivatives thereof. Examples include acrylamide and methacrylamide; and also vinylsulfonic acid, 2-acrylamido-2-methylpropanesulfonic acid, styrenesulfonic acid, and water-soluble salts thereof, and also N-vinylpyrrolidone; 2-vinylpyridine, 4-vinylpyridine; 2-vinylimidazole; 2-(N,N-dimethylannino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate.

The abovementioned water-soluble monomers $N_2$ are usually present merely as modifying monomers in amounts of <10% by weight, preferably <5% by weight and especially preferably <3% by weight, based on the entirety of monomers $N_2$.

Further monomers $N_2$ which typically increase the internal strength of the filmed polymer matrix normally have at least one epoxy, hydroxyl, N-methylol, or carbonyl group, or at least two non-conjugated ethylenically unsaturated double bonds. Examples of these are monomers having two vinyl moieties, monomers having two vinylidene moieties, and also monomers having two alkenyl moieties. Particularly advantageous monomers here are the diesters of dihydric alcohols with α,β-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene glycol 1,2-diacrylate, propylene glycol 1,3-diacrylate, butylene glycol 1,3-diacrylate, butylene glycol 1,4-diacrylate and ethylene glycol dimethacrylate, propylene glycol 1,2-dimethacrylate, propylene glycol 1,3-dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular importance in this context are the $C_1$- to $C_8$-hydroxyalkyl esters of methacrylic and of acrylic acid, for example n-hydroxyethyl, n-hydroxypropyl, or n-hydroxybutyl acrylate and the corresponding methacrylate, and also compounds such as diacetoneacrylamide and acetylacetoxyethyl acrylate and the corresponding methacrylate.

Frequently, the aforementioned crosslinking monomers $N_2$ are used in amounts of <10% by weight, but preferably in amounts of <5% by weight, based in each case on the entirety of monomers $N_2$. However, it is especially preferable not to use any of these crosslinking monomers $N_2$ to produce the polymer N.

Preferred polymers N are obtainable via free-radical-initiated solution polymerization only of monomers $N_1$, more preferably of 65% to 100% by weight, even more preferably of 70% to 90% by weight, of acrylic acid with more preferably 0% to 35% by weight, even more preferably 10% to 30% by weight, of maleic acid or maleic anhydride.

The weight-average molecular weight $M_w$ of polymer N is advantageously in the range from 1000 to 500,000 g/mol, preferably 10,000 to 300,000 g/mol, more preferably 30,000 to 120,000 g/mol.

Adjustment of the weight-average molecular weight $M_w$ during the production of polymer N is familiar to the person skilled in the art, and is advantageously achieved via free-radical-initiated aqueous solution polymerization in the presence of compounds that provide free-radical-chain transfer, known as free-radical-chain regulators. Determination of the weight-average molecular weight $M_w$ is also familiar to the person skilled in the art, and is achieved by way of example by means of gel permeation chromatography.

Commercially available products with good suitability for polymers N are by way of example the Sokalan® products from BASF SE, which are by way of example based on acrylic acid and/or maleic acid. WO-A-99/02591 describes other suitable polymers.

Crosslinkers with good suitability are those with a (weight-average) molecular weight in the range from 30 to 10,000g/mol. Examples include: alkanolamines, such as triethanolamine; carboxylic acids, such as citric acid, tartaric acid, butanetetracarboxylic acid; alcohols, such as glucose, sucrose, or other sugars, glycerol, glycol, sorbitol, trimethylolpropane; epoxides, such as bisphenol A or bisphenol F, and also resins based thereon and moreover polyalkylene oxide glycidyl ethers or trimethylolpropane triglycidyl ether. In a preferred embodiment of the invention, the molecular weight of the low molecular weight crosslinker used is in the range from 30 to 4000 g/mol, more preferably in the range from 30 to 500 g/mol.

Other suitable polymer-based binders are aqueous dispersions which comprise one or more polymers composed of the following monomers:
  a. 0% to 50% by weight of at least one ethylenically unsaturated monomer which comprises at least one epoxy group and/or at least one hydroxyalkyl group (monomer(s) $M_1$), and
  b. 50% to 100% by weight of at least one other ethylenically unsaturated monomer which differs from the monomers $M_1$ (monomer(s) $M_2$).

Polymer M is obtainable via free-radically initiated emulsion polymerization of the appropriate monomers $M_1$ and/or $M_2$ in an aqueous medium. Polymer M may have one or more phases. Polymer M may have a core-shell structure.

The conduct of free-radically initiated emulsion polymerizations of ethylenically unsaturated monomers in an aqueous medium has been widely described and is therefore well known to the person skilled in the art (see by way of example: "Emulsionspolymerisation" [Emulsion Polymerization] in Encyclopedia of Polymer Science and Engineering, volume 8, pages 659 ff. (1987); D. C. Blackley, in High Polymer Latices, volume 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A-40 03 422 and Dispersionen synthetischer Hochpolymerer [Dispersions of Synthetic High Polymers], F. Hölscher, Springer-Verlag, Berlin (1969)).

The procedure for the free-radical-initiated aqueous emulsion polymerization reactions is usually that the ethylenically unsaturated monomers are dispersed in the form of monomer droplets in the aqueous medium ith simultaneous use of dispersing aids, and are polymerized by means of a free-radical polymerization initiator.

Useful monomer(s) $M_1$ especially include glycidyl acrylate and/or glycidyl methacrylate, and also hydroxyalkyl acrylates and the corresponding methacrylates, in both cases having $C_2$- to $C_{10}$-hydroxyalkyl groups, in particular $C_2$- to $C_4$-hydroxyalkyl groups, and preferably $C_2$- and $C_3$-hydroxyalkyl groups, for example 2-hydroxyethyl acrylate, 2-hydroxyethyl methacrylate, 3-hydroxypropyl acrylate, 3-hydroxypropyl methacrylate, 4-hydroxybutyl acrylate, and/or 4-hydroxybutyl methacrylate. It is particularly advantageous to use one or more, preferably one or two, of the following monomers M1: 2-hydroxyethyl acrylate, 2-hydroxyethyl methacrylate, glycidyl acrylate, glycidyl methacrylate.

In the invention it is optionally possible to use some of, or the entirety of, monomers $M_1$ as initial charge in the polymerization vessel. However, it is also possible to meter the entirety or any remaining residual amount of monomers $M_1$ into the mixture during the polymerization reaction. The manner in which the entirety or any remaining residual amount of monomers $M_1$ is metered into the polymerization vessel here can be batchwise in one or more portions, or continuous with constant or varying flow rates. It is particularly advantageous that the metering of the monomers $M_1$ takes place continuously during the polymerization reaction, with flow rates that remain the same, in particular as a constituent of an aqueous monomer emulsion.

Useful monomer(s) $M_2$ are in particular ethylenically unsaturated compounds that are easily copolymerizable with monomer(s) $M_1$ by a free-radical route, for example ethylene; vinylaromatic monomers such as styrene, α-methylstyrene, o-chlorostyrene, or vinyltoluenes; vinyl halides such as vinyl chloride or vinylidene chloride; esters derived from vinyl alcohol and from monocarboxylic acids having from 1 to 18 carbon atoms, for example vinyl acetate, vinyl propionate, vinyl n-butyrate, vinyl laurate, and vinyl stearate; esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having from 1 to 12, preferably from 1 to 8, and in particular from 1 to 4, carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid; nitriles of α,β-monoethylenically unsaturated carboxylic acids, for example acrylonitrile, methacrylonitrile, fumaronitrile, maleonitrile, and also $C_4$- to $C_8$-conjugated dienes, such as 1,3-butadiene and isoprene. The monomers mentioned generally form the main monomers, and these combine to form a proportion of >50% by weight, preferably >80% by weight, and particularly >90% by weight, based on the entirety of the monomers $M_2$. The solubility of these monomers in water under standard conditions (20° C., 1 atm (absolute)) is very generally only moderate to low.

Monomers $M_2$ which have higher water solubility under the abovementioned conditions are those which comprise either at least one acid group and/or anion corresponding thereto or at least one amino, amido, ureido, or N-heterocyclic group, and/or nitrogen-protonated or—alkylated ammonium derivatives thereof. Examples include α,β-monoethylenically unsaturated mono- and dicarboxylic acids having from 3 to 6 carbon atoms and amides thereof, e.g. acrylic acid, methacrylic acid, maleic acid, fumaric acid, itaconic acid, acrylamide, and methacrylamide; and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dinnethylaminopropyl)methacrylamide, 2-(1-imidazolin-2-onyl)ethyl methacrylate and ureido methacrylate. The abovementioned water-soluble monomers $M_2$ are usually present merely as modifying monomers in amounts of <10% by weight, preferably <5% by weight, and more preferably <3% by weight, based on the entirety of monomers $M_2$.

Monomers $M_2$, which usually increase the internal strength of the filmed polymer matrix, normally have at least one N-methylol or carbonyl group, or at least two non-conjugated ethylenically unsaturated double bonds. Examples of these are monomers having two vinyl moieties, monomers having two vinylidene moieties, and also monomers having two alkenyl moieties. Particularly advantageous monomers here are the diesters of dihydric alcohols with $\alpha,\beta$-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene glycol 1,2-diacrylate, propylene glycol 1,3-diacrylate, butylene glycol 1,3-diacrylate, butylene glycol 1,4-diacrylate and ethylene glycol dimethacrylate, propylene glycol 1,2-dimethacrylate, propylene glycol 1,3-dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Examples of other compounds of importance in this context are diacetoneacrylamide and acetylacetoxyethyl acrylate and the corresponding methacrylate. Amounts of the abovementioned crosslinking monomers $M_2$ used are frequently <10% by weight, preferably <5% by weight, and more preferably <3% by weight, each based on the entirety of monomers $M_2$. However, the amount of these crosslinking monomers $M_2$ used is frequently zero.

In the invention it is optionally possible to use some of, or the entirety of, monomers $M_2$ as initial charge in the polymerization vessel. However, it is also possible to meter the entirety or any remaining residual amount of monomers $M_2$ into the mixture during the polymerization reaction. The manner in which the entirety or any remaining residual amount of monomers $M_2$ is metered into the polymerization vessel here can be batchwise in one or more portions, or continuous with constant or varying flow rates. It is particularly advantageous that the metering of the monomers $M_2$ takes place continuously during the polymerization reaction, with flow rates that remain the same, in particular as a constituent of an aqueous monomer emulsion.

Production of the aqueous dispersion of component (II) frequently also makes use of dispersing aids which maintain stable dispersion, in the aqueous phase, not only of the monomer droplets but also of the polymer particles obtained via the free-radical-initiated polymerization reaction, and thus ensure that the resultant aqueous polymer composition is stable. These may be not only the protective colloids usually used in the conduct of free-radical aqueous emulsion polymerization reactions, but also emulsifiers.

Suitable protective colloids are, for example, polyvinyl alcohols, cellulose derivatives or copolymers comprising vinylpyrrolidone or acrylic acid. A detailed description of other suitable protective colloids is found in Houben-Weyl, Methoden der organischen Chemie [Methods of Organic Chemistry], vol. XIV/1, Makromolekulare Stoffe [Macromolecular Materials], pages 411 to 420, Georg-Thieme-Verlag, Stuttgart, 1961.

It is also possible, of course, to use mixtures of emulsifiers and/or protective colloids. Dispersing aids frequently used comprise exclusively emulsifiers, the relative molecular weights of these usually being below 1000, in contrast to protective colloids. They may be either anionic, cationic, or nonionic. When mixtures of interface-active substances are used, the individual components must, of course, be compatible with one another, and in case of doubt this can be checked by a few preliminary experiments. Anionic emulsifiers are generally compatible with one another and with nonionic emulsifiers. The same also applies to cationic emulsifiers, whereas anionic and cationic emulsifiers are mostly not compatible with one another.

Commonly used emulsifiers are, for example, ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO level: 3 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Other suitable emulsifiers are found in Houben-Weyl, Methoden der organischen Chemie, vol. XIV/1, Makromolekulare Stoffe, pages 192 to 208, Georg-Thieme-Verlag, Stuttgart, 1961.

Preference is given to use of nonionic and/or anionic emulsifiers for the process of the invention.

The amount of dispersing aid, in particular emulsifiers, used is generally 0.1% to 5% by weight, preferably 1% to 3% by weight, based in each case on the entirety of the monomer mixture M. If protective colloids are used as sole dispersing aids, the amount used is markedly higher; it is customary to use 5% to 40% by weight of dispersing aid, preferably 10% to 30% by weight, based in each case on the entirety of the monomer mixture M.

In the invention it is optionally possible to use some of, or the entirety of, dispersing aid as initial charge in the polymerization vessel. Alternatively, it is possible to meter in the entirety or any remaining residual amount of dispersing aid during the polymerization reaction. The manner in which the entirety or any remaining residual amount of dispersing aid is metered into the polymerization vessel here can be batchwise in one or more portions, or continuous with constant or varying flow rates. It is particularly advantageous that the metering of the dispersing aids takes place continuously during the polymerization reaction, with constant flow rates, in particular as a constituent of an aqueous monomer emulsion.

Preferred polymers M comprise a) 0.01% to 50% by weight of at least one ethylenically unsaturated monomer which comprises at least one epoxy group and/or at least one hydroxyalkyl group (monomer(s) $M_1$), and b) 50% to 99.99% by weight of at least one other ethylenically unsaturated monomer which differs from the monomers $M_1$ (monomer(s) $M_2$).

Particularly preferred polymers M of this type are obtainable via free-radical-initiated solution polymerization of 10% to 30% by weight, preferably 15% to 22% by weight, of acrylic and/or methacrylic esters of $C_1$- to $C_8$-alcohols—preferably methanol, n-butanol, 2-ethylhexanol—with 40% to 70% by weight, preferably 55% to 65% by weight, of styrene, and 5% to 50% by weight, preferably 20% to 30% by weight, of 2-hydroxyethyl acrylate and/or 2-hydroxyethyl methacrylate, and/or glycidyl acrylate and/or glycidyl methacrylate, where the entirety of the components is 100% by weight.

Other preferred polymers M comprise no monomer(s) $M_1$ and are obtainable via free-radical-initiated solution polymerization of 80% to 99% by weight, preferably 85% to 95% by weight, of acrylic and/or methacrylic esters of $C_1$- to $C_8$-alcohols—preferably methanol, n-butanol, 2-ethylhexanol—with 0% to 5% by weight, preferably 1% to 3% by weight, of ureidomethacrylate and 0.5% to 5% by weight, preferably 1% to 4% by weight, of α,β-monoethylenically unsaturated mono- and dicarboxylic acids having 3 to 6 carbon atoms—preferably acrylic acid, methacrylic acid—and/or amides of these acids, where the entirety of the components is 100% by weight.

Other preferred polymers M are obtainable via use of dispersing aids based on poly(acrylic acid)(s) as described in EP-A-1240205 or DE-A-19991049592.

Other suitable aqueous dispersions are dispersions selected from the group of the polyurethanes, the halogenated vinyl polymers, the vinyl alcohol polymers and/or vinyl ester polymers, rubber, rosins, and hydrocarbon resins. Dispersions of this type are obtainable commercially, an example being Vinnepas® ethylene-vinyl acetate dispersions from Wacker or Tacylon rosins from Eastman Chemical Company. Preference is given to aqueous dispersions of aliphatic and aromatic polyurethanes, to polyvinyl acetate homo- and copolymers, and to terpentine resins and hydrocarbon resins.

Components B) and G-2):

The amount of component B) based on component LCP-1) is in the range from 0.05% to 3% by weight, preferably 0.1% to 1% by weight, more preferably 0.15% to 0.5% by weight.

The amount of component G-2) based on component LCP-2) is in the range from 0% to 3% by weight, preferably 0% to 1% by weight, more preferably 0% to 0.1% by weight, most preferably 0% by weight.

Components B) and G-2) may are selected from the group of the organic isocyanates having at least two isocyanate groups.

Suitable organic isocyanates having at least two isocyanate groups are any of the organic isocyanates known to the person skilled in the art, preferably those for the production of woodbase materials or polyurethanes, or a mixture of these isocyanates. Organic isocyanates of this type, and also production and use thereof, are described by way of example in Becker/Braun, Kunststoff Handbuch, 3rd revised edition, volume 7 "Polyurethane", Hanser 1993, pages 17 to 21, pages 76 to 88, and pages 665 to 671.

Preferred organic isocyanates are oligomeric isocyanates having 2 to 10, preferably 2 to 8, monomer units and an average of at least one isocyanate group per monomer unit, or a mixture of these. The isocyanates may be aliphatic, cycloaliphatic, or aromatic. More preferably, the organic isocyanate is MDI (methylene diphenyl diisocyanate) or the oligomeric organic isocyanate is PMDI (polymeric methylene diphenyl diisocyanate) or mixtures of MDI and PMDI. These organic isocyanates are obtainable via condensation of formaldehyde with aniline and phosgenation of the isomers and oligomers produced in the condensation reaction (see by way of example Becker/Braun, Kunststoff Handbuch, 3rd revised edition, volume 7 "Polyurethane", Hanser 1993, page 18 final paragraph to page 19 second paragraph, and page 76 fifth paragraph). Very particular preference is given to products from the LUPRANAT® line, in particular LUPRANAT® M 20 FB from BASF SE.

The organic isocyanate may also be an isocyanate-terminated prepolymer which is the reaction product of an isocyanate, e.g. PMDI, with one or more polyols and/or polyamines.

It is possible to use polyols selected from the group of ethylene glycol, diethylene glycol, propylene glycol, dipropylene glycol, butanediol, glycerol, trimethylolpropane, triethanolamine, pentaerythritol, sorbitol, and mixtures thereof. Other suitable polyols are biopolyols, such as polyols derived from soya oil, rapeseed oil, castor oil, and sunflower oil. Other suitable materials are polyether polyols which can be obtained via polymerization of cyclic oxides, for example ethylene oxide, propylene oxide, butylene oxide, or tetrahydrofuran in the presence of polyfunctional initiators. Suitable initiators comprise active hydrogen atoms, and may be water, butanediol, ethylene glycol, propylene glycol, diethylene glycol, triethylene glycol, dipropylene glycol, ethanolamine, diethanolamine, triethanolamine, toluenediamine, diethyltoluenediamine, phenyldiamine, diphenylmethanediamine, ethylenediamine, cyclohexanediamine, cyclohexanedimethanol, resorcinol, bisphenol A, glycerol, trimethylolpropane, 1,2,6-hexanetriol, pentaerythritol, or any mixture thereof. Other suitable polyether polyols comprise diols and triols such as polyoxypropylenediols and -triols, and poly(oxyethylene-oxypropylene)diols and -triols, these being produced via simultaneous or successive addition reactions of ethylene oxides and propylene oxides with di- or trifunctional initiators. Other suitable materials are polyester polyols such as hydroxy-terminated reaction products of polyols as described above with polycarboxylic acids or polycarboxylic acid derivatives, e.g. anhydrides thereof, in particular dicarboxylic acids or dicarboxylic acid derivatives, for example succinic acid, dimethyl succinate, glutaric acid, dimethyl glutarate, adipic acid, dimethyl adipate, sebacic acid, phthalic anhydride, tetrachlorophthalic anhydride, or dimethyl terephthalate, or a mixture thereof.

It is possible to use polyamines selected from the group of ethylenediamine, toluenediamine, diaminodiphenylmethane, polymethylene polyphenyl polyamines, amino alcohols, and mixtures thereof. Examples of amino alcohols are ethanolamine and diethanolamine.

The organic isocyanates can also be used in the form of an aqueous emulsion. Preference is given to using anhydrous organic isocyanates.

The percentage by weight in the case of the organic isocyanates is based on the isocyanate component per se, i.e., for example, without water as emulsification medium.

Components A) and F):

The amount of component A) based on component LCP-1) is generally 0.005% to 0.5% by weight, preferably 0.008% to 0.2% by weight, more preferably 0.01% to 0.1% by weight.

The amount of component F) based on component LCP-2) is generally 0% to 0.3% by weight, preferably 0% to 0.1% by weight, more preferably 0% to 0.05% by weight, most preferably 0% by weight.

Components A) and F) are each independently selected from the group of the organic carboxylic acids, carboxylic anhydrides, carbonyl chlorides or mixtures thereof, preferably from the group of the organic carboxylic acids and carboxylic anhydrides and more preferably from the group of the organic carboxylic anhydrides.

Suitable organic carboxylic acids, carboxylic anhydrides and carbonyl chlorides are those having a molecular weight of less than 2000 g/mol, preferably less than 1000 g/mol, more preferably less than 500 g/mol.

Suitable organic carbonyl chlorides are $C_2$ to $C_{20}$ carbonyl chlorides, for example acetyl chloride and phthaloyl chloride, preferably $C_2$ to $C_{15}$ carbonyl chlorides, most preferably $C_2$ to $C_8$ carbonyl chlorides.

Suitable organic carboxylic anhydrides are $C_2$ to $C_{50}$ carboxylic anhydrides such as acetic anhydride, succinic anhydride, phthalic anhydride, glutaric anhydride, polymaleic anhydride, perylenetetracarboxylic anhydride, itaconic anhydride, maleic anhydride (MA), preferably $C_4$ to $C_{15}$ carboxylic anhydrides such as succinic anhydride, phthalic anhydride, maleic anhydride (MA), more preferably $C_4$ to $C_8$ carboxylic anhydrides such as succinic anhydride, itaconic anhydride and maleic anhydride (MA), most preferably maleic anhydride (MA).

Suitable organic carboxylic acids are $C_1$ to $C_{15}$ carboxylic acids such as formic acid, acetic acid, maleic acid, fumaric acid, succinic acid, itaconic acid, benzoic acid, phthalic acid and sebacic acid. Preferred organic carboxylic acids are maleic acid, fumaric acid, succinic acid and acetic acid.

In a preferred embodiment, a portion or the entire amount, preferably the entire amount, of component A) is mixed with component B) or a portion of component B) to give a mixture AB) before it is contacted with component LCP-1).

In a further preferred embodiment, a portion or the entire amount, preferably the entire amount, of component A) is mixed with component B) or a portion of component B) and with component E) or a portion of component E) to give a mixture ABE) before it is contacted with component LCP-1).

In a further preferred embodiment, component A) used for the mixture AB) or ABE) preferably comprises carboxylic acids or carboxylic anhydrides, more preferably carboxylic anhydrides. If carboxylic acids are used, the period of time between the mixing and the adding of mixture AB) or ABE) to the lignocellulose particles LCP-1) is generally less than 5 minutes, preferably less than 1 minute, more preferably less than 10 seconds.

Mixtures AB) or ABE) preferably comprise:
 i) 50% to 99% by weight, preferably 70% to 97% by weight, more preferably 80% to 95% by weight, especially 85% to 92% by weight, of component A) and
 ii) 1% to 50% by weight, preferably 3% to 30% by weight, more preferably 5% to 20% by weight, especially 8% to 15% by weight, of component B) and
 iii) 0% to 49% by weight, preferably 0% to 10% by weight, more preferably 0% to 5% by weight, of component E),
where component E) here is preferably selected from the group of the inert diluents, the surfactants and the trialkyl phosphates.

Most preferably, the mixture AB) or ABE) is used in the form of an essentially anhydrous mixture. An essentially anhydrous mixture is understood here to mean a mixture comprising 0% to 1% by weight, preferably 0% to 0.1% by weight, more preferably 0% to 0.01% by weight and most preferably 0% to 0.001% by weight of water, especially 0% by weight of water.

In further very particularly preferred embodiments, the mixture AB) or ABE) is in the form of a solution.

The mixture AB) or ABE) may optionally be produced by mixing the constituents shortly before the addition to the lignocellulose particles LCP-1) if the addition to the lignocellulose particles is effected separately from component C), or prior to the addition to component C) if the addition to the lignocellulose particles is effected as a mixture. The period of time between production and addition here is 3 hours or less. The period of time may also be very short and may be just a few minutes, for example 5 min or less. The mixing here may be effected by supplying the constituents from separate vessels to a mixing unit, e.g. mixing vessel or static mixer, and mixing them therein.

In a particularly preferred embodiment, the proportion by weight of component A) in the mixture AB) or ABE) used may be established by mixing two or more, preferably two, mixtures AB) and/or ABE) that differ in their proportions by weight of component A) with one another. This embodiment is advantageous especially in a continuous process since, via alteration of the mixing ratio of the mixtures, it is possible to easily and rapidly adjust the parameter a [amount of acid equivalents of component A) relative to the mass of component C)] when there is a change in the temperature T in the process.

In a further particularly preferred embodiment, the proportion by weight of component A) in the mixture AB) or ABE) used may be established by mixing a mixture AB) or ABE) with a portion of component B). This embodiment is likewise advantageous especially in a continuous process since it is also possible here, via alterations in the mixing ratio, to easily and rapidly adjust the parameter a when there is a change in the temperature T in the process.

Components D) and H):

Components D) and H) used are ammonium salts. These show latent hardening of amino resins show (M. Dunky, P. Niemz, Holzwerkstoffe und Leime, Springer 2002, pages 265 to 269), and are therefore also referred to as latent hardeners. "Latent" means here that the hardening reaction does not take place immediately after the mixing of the amino resin and the hardener, but only after a time delay, or after activation of the hardener by means of temperature, for example. The delayed hardening increases the processing time for an amino resin/hardener mixture. The use of latent hardeners can also be advantageous for the mixture of the lignocellulose particles with amino resin, hardener and the other components because there can be lower preliminary hardening of the amino resin prior to process step iv). Preferred latent hardeners are ammonium chloride, ammonium bromide, ammonium iodide, ammonium sulfte, ammonium sulfite, ammonium methanesulfonate, ammonium phosphate, ammonium nitrate or mixtures thereof, preferably ammonium sulfate, ammonium nitrate, ammonium chloride or mixtures thereof, more preferably ammonium sulfate, ammonium nitrate or mixtures thereof.

In addition to the ammonium salts, components D) and H) may also comprise small amounts of inorganic acids or acidic salts of inorganic acids, for example sulfuric acid, nitric acid, aluminum chloride, aluminum sulfate. If such a mixture is used, the mass ratio of inorganic acid and/or acidic salt of inorganic acids is less than 10:90, preferably less than 5:95, where the absolute amount of inorganic acid and/or acidic salt of inorganic acids is not more than 0.1% by weight, based on the dry weight of component LCP-1) or LCP-2), preferably not more than 0.02% by weight.

In a particularly preferred embodiment, solely ammonium salts are employed, and no inorganic acids or salts of inorganic acids.

The amount of component D) based on the total dry weight of component LCP-1) is in the range from 0% to 2% by weight, more preferably 0.05% to 1.0% by weight, most preferably 0.1% to 0.5% by weight.

The amount of component H) based on the total dry weight of component LCP-2) is in the range from 0% to 2% by weight, more preferably 0% to 0.5% by weight, most preferably 0% to 0.2% by weight.

If component G-1) does not comprise any amino resin, the amount of component H) is preferably 0% by weight.

Components E) and I):

Components E) and I) may be selected from the group of the surfactants and/or the trialkyl phosphates and/or the group of further additives known to those skilled in the art, for example hydrophobizing agents such as paraffin emulsions, antifungal agents, formaldehyde scavengers, for example urea or polyamines, flame retardants, solvents, for example alcohols, glycols, glycerol, metals, carbon, pigments, dyes, alkali metal or alkaline earth metal salts from the group of the sulfates, nitrates, phosphates, halides, or hardeners for phenolic resins (if component G-1) comprises phenolic resin), or mixtures thereof. It is independently possible to use identical or different additives in amounts of 0% to 5% by weight, preferably 0.5% to 4% by weight, more preferably 1% to 3% by weight, based on the total dry content of the lignocellulose particles LCP-1) or LCP-2).

Suitable surfactants are anionic, cationic, nonionic or amphoteric surfactants, and mixtures thereof. Particular preference is given to nonionic or amphoteric surfactants and mixtures thereof, particular preference to nonionic surfactants.

Examples of surfactants are listed in McCutcheon's, Vol. 1; Emulsifiers & Detergents, McCutcheon's Directories, Glen Rock, USA, 2008 (International Ed. or North American Ed.).

Suitable anionic surfactants are alkali metal, alkaline earth metal or ammonium salts of sulfonates, sulfates, phosphates, carboxylates or mixtures thereof. Examples of sulfonates are alkylarylsulfonates, diphenylsulfonates, α-olefinsulfonates, lignosulfonates, sulfonates of fatty acids and oils, sulfonates of ethoxylated alkyl phenols, sulfonates of alkoxylated arylphenols, naphthalenesulfonate condensates, dodecyl- and tridecylbenzenesulfonates, naphthalene- and sikylnaphthalenesulfonates or sulfosuccinates. Examples of sulfates are sulfates of fatty acids and oils, ethoxylated alkylphenol sulfates, alcohol sulfates, sulfates of ethoxylated alcohols, or fatty acid ester sulfates.

Suitable nonionic surfactants are alkoxylates, N-substituted fatty acid amides, amine oxides, esters, sugar-based surfactants, polymeric surfactants, block polymers, and mixtures thereof. Examples of alkoxylates are compounds such as alcohols, alkylphenols, amines, amides, arylphenols, fatty acids or fatty acid esters, having been alkoxylated with 1 to 50 equivalents of alkylene oxide. Ethylene oxide and/or propylene oxide can be used for the alkoxylation, preferably ethylene oxide. Examples of N-substituted fatty acid amides are fatty acid glucamides or fatty acid alkanolamides. Examples of esters are fatty acid esters, glycerol esters, or monoglycerides. Examples of sugar-based surfactants are sorbitan, ethoxylated sorbitans, sucrose esters and glycose esters, or alkylpolyglucosides. Examples of polymeric surfactants are homopolymers or copolymers of vinylpyrrolidone, vinyl alcohol, or vinyl acetate. Suitable block polymers are block polymers of A-B or A-B-A type comprising blocks of polyethylene oxide and polypropylene oxide, or of A-B-C type comprising alkanol and blocks of polyethylene oxide and polypropylene oxide. Preference is given to fatty alcohol polyglycol ethers.

Suitable cationic surfactants are quaternary surfactants, examples being quaternary ammonium compounds having one or two hydrophobic groups, or ammonium salts of long-chain primary amines.

Suitable amphoteric surfactants are alkyl betaines and imidazolines.

Particularly preferred surfactants are fatty alcohol polyglycol ethers, fatty alcohol sulfates, sulfonated fatty alcohol polyglycol ethers, fatty alcohol ether sulfates, sulfonated fatty acid methyl esters, sugar surfactants, such as alkyl glycosides, alkylbenzenesulfonates, alkanesulfonates, methyl ester sulfonates, quaternary ammonium salts, such as cetyltrimethylammonium bromide, and soaps.

Suitable trialkyl phosphates are compounds of the structure $R_3PO_4$ where each of the three (3) R radicals may independently be an alkyl group having 1, 2, 3, 4, 5 or 6 carbon atoms. Each R group may have the same number or a different number, preferably the same number, of carbon atoms. Given the same number of carbon atoms, the groups may either be identical groups or isomeric groups, preferably identical groups.

For example, it is possible to use trimethyl phosphate, triethyl phosphate, tripropyl phosphate, tributyl phosphate, tripentyl phosphate, trihexyl phosphate or mixtures thereof, preferably trimethyl phosphate, triethyl phosphate, tripropyl phosphate or mixtures thereof, more preferably triethyl phosphate.

Hardeners used for phenolic resins may, for example, be carbonates or hydroxides such as potassium carbonate or sodium hydroxide. Also suitable is hexamethylenetetramine. Further examples of hardeners for phenolic resins are known from M. Dunky, P. Niemz, Holzwerkstoffe und Leime, Springer 2002, pages 341 to 352.

Further suitable additives may, for example, be inert diluents for the isocyanate components (components B) and G-2)). Suitable inert diluents are inert liquids, for example aromatic compounds such as toluene, benzene, xylenes, naphthalenes, chlorobenzene, organic solvents such as acetone, ether, ethyl acetate, THF, carbonic esters (for example dimethyl carbonate, diethyl carbonate, diphenyl carbonate, propylene carbonate, ethylene carbonate), alkanes and alkenes (for example pentene, hexane, cyclohexane, heptane), paraffin oil, waxes, silicone oils, preferably carbonic esters, paraffin oil or silicone oil, more preferably carbonic esters or paraffin oil.

Use:

By the process of the invention, it is possible to produce different kinds of single-layer and multilayer lignocellulose materials, particular preference being given to single-layer and multilayer particleboards and fiberboards and oriented strand boards (OSBs), most preferably single-layer particle- and fiberboards and multilayer particleboard, especially multilayer particleboards.

The total thickness of the multilayer lignocellulose materials of the invention varies with the field of use and is generally in the range from 0.5 to 100 mm, preferably in the range from 10 to 40 mm, especially 15 to 20 mm.

The single-layer and multilayer lignocellulose materials of the invention generally have a mean overall density of 100 to 1000 kg/m$^3$, preferably 400 to 850 kg/m$^3$.

The multilayer particleboards of the invention generally have a mean overall density of 400 to 750 kg/m$^3$, more preferably 425 to 650 kg/m$^3$, especially 450 to 600 kg/m$^3$. The density is determined 24 h hours after production according to EN 1058.

The lignocellulose materials produced by the process of the invention, especially single-layer and multilayer particleboards and single-layer fiberboards, are used mainly in construction, in interior fitout, in shopfitting and exhibition stand construction, as a material for furniture and as packaging material.

In a preferred use, the lignocellulose materials produced by the process of the invention are used as inner plies for sandwich panels. In this case, the outer plies of the sandwich panels may consist of different materials, for example of metal such as aluminum or stainless steel, or of thin wood-base material boards, such as particleboards or fiberboards, preferably high-density fiberboards (HDF), or of laminates, for example high-pressure laminate (HPL).

In a further preferred use, the lignocellulose materials produced by the process of the invention are coated on one or more sides, for example with furniture films, with melamine films, with veneers, with a plastic edge or with paint.

Examples of uses of the lignocellulose materials produced by the in accordance with the invention or of the coated lignocellulose materials produced therefrom or of the sandwich panels produced therefrom in construction, interior fitout and shopfitting and exhibition stand construction are as roof and wall paneling, infill, cladding, floors, inner layers of doors, separating walls or shelves.

Examples of uses of the lignocellulose materials produced by the process of the invention or of the coated lignocellulose materials produced therefrom or of the sandwich panels produced from the lignocellulose materials in furniture construction are as support material for free-standing cabinets, as shelf, as door material, as workbench, as kitchen unit front, as elements in tables, chairs and upholstered furniture.

The invention claimed is:

1. A process for batchwise or continuous production of a single-layer or multilayer lignocellulose material, comprising the process steps of
   (Ia) producing a mixture M1 and
   (Ib) optionally one or more mixture(s) M2,
   (II) scattering mixture M1 and any mixture(s) M2 to give a mat,
   (III) optionally precompacting the scattered mat and
   (IV) hot pressing,
wherein mixture M1 comprises lignocellulose particles (LCP-1) and additionally
   a) 0.005% to 0.5% by weight of organic carboxylic acid, carboxylic anhydride, carbonyl chloride or mixtures thereof (component A)
   b) 0.05% to 3% by weight of organic isocyanates having at least two isocyanate groups (component B) and
   c) 5% to 15% by weight of binder selected from the group of the amino resins (component C)
   d) 0% to 2% by weight of hardener (component D) and
   e) 0% to 5% by weight of additive (component E), and mixture(s) M2 comprise(s) lignocellulose particles (LCP-2) and additionally
   f) 0% to 0.3% by weight of organic carboxylic acid, carboxylic anhydride, carbonyl chloride or mixtures thereof (component F),
   g) 1% to 30% by weight of binder selected from the group consisting of amino resin, phenolic resin, protein-based binder and other polymer-based binders, and mixtures thereof (component G-1) and 0% to 3% by weight of organic isocyanate having at least two isocyanate groups (component G-2),
   h) 0% to 2% by weight of hardener (component H) and
   i) 0% to 5% by weight of additives (component I),
with the proviso that the following conditions are fulfilled:

$$a_{min} < a < a_{max}$$

and $$a_{min} = [(-T/6000) + (65/6000)]$$

and $$a_{max} = [(-T/2000) + (75/2000)]$$

where

T is the temperature of mixture M1 in ° C. after process step (Ia) and is between 10 and 65° C., and
a is the amount of acid equivalents in component A) in relation to the mass of component C) in mol/100 g.

2. The process for batchwise or continuous production of single-layer or multilayer lignocellulose materials according to claim 1, wherein, in process step (Ia), component A) or the mixture of component A) and component B) or the mixture of component A), component B) and component E) and
   component C) or
   a mixture of component C) with one or more components selected from the group of components B), D) and E)
   are applied to the lignocellulose particles (LCP-1)
   (1) separately from one another or
   (2) as a mixture within 0.1 to 3600 seconds after production of the mixture.

3. The process for batchwise or continuous production of single-layer or multilayer lignocellulose materials according to claim 1, wherein some or all of component A) is mixed with component B) or a portion of component B) before it is contacted with the lignocellulose particles (LCP-1).

4. The process for batchwise or continuous production of single-layer or multilayer lignocellulose materials according to claim 1, wherein all of component A) is mixed with component B) or a portion of component B) before it is contacted with the lignocellulose particles (LCP-1).

5. The process for batchwise or continuous production of single-layer or multilayer lignocellulose materials according to claim 1, wherein a portion or the entire amount, of component A) is mixed with component B) or a portion of component B) and with component E) or a portion of component E) to give a mixture ABE) before it is contacted with component LCP-1).

6. The process for batchwise or continuous production of single-layer or multilayer lignocellulose materials according to claim 1, wherein component C) which has optionally been mixed in a separate step with one or more components selected from the groups of components B), D) and E), and component A) or the mixture of component A) with component B) or the mixture of component A) with component B) and component E) are added to the lignocellulose particles LCP-1) or to the mixture of lignocellulose particles LCP-1) with one or more components selected from the groups of components B), D) and E) separately from one another or as a mixture within 0.1 to 3600 seconds.

7. The process for batchwise or continuous production of single-layer or multilayer lignocellulose materials according to claim 1, wherein an initial charge of component LCP-1) is mixed with component C) and component D), together or in any sequence, followed by addition of component E) and then of components A) and B), together or in any sequence, or of components A) and B), together or in any sequence, and then of component E).

8. The process for batchwise or continuous production of single-layer or multilayer lignocellulose materials according to claim 1, wherein an initial charge of component LCP-1) is mixed with component A) and component B), together or in any sequence, followed by addition of component E) and then of components C) and D), together or in any sequence, or of components C) and D), together or in any sequence, and then of component E).

9. The process for batchwise or continuous production of single-layer or multilayer lignocellulose materials according to claim 1, wherein an initial charge of component LCP-1) is mixed with component E), followed by addition of component C) and component D), together or in any sequence, then of components A) and B), together or in any sequence, or of components A) and B), together or in any sequence, and then of component C) and component D), together or in any sequence.

10. The process for batchwise or continuous production of single-layer or multilayer lignocellulose materials according to claim 1, wherein an initial charge of component LCP-1) is mixed with component E), followed by addition of a mixture of components A), B), C) and D).

11. The process for batchwise or continuous production of single-layer or multilayer lignocellulose materials according to claim 1, wherein an initial charge of component LCP-1) is mixed with a mixture of components A), B), C) and D), followed by addition of component E).

12. The process for batchwise or continuous production of single-layer or multilayer lignocellulose materials according to claim 1, wherein an initial charge of component LCP-1) is mixed with a portion of component E), followed by addition of a mixture of a further portion of component E) and components A), B), C) and D).

13. The process for batchwise or continuous production of single-layer or multilayer lignocellulose materials according to claim 1, wherein an initial charge of component LCP-1) is mixed with a mixture of a portion of component E) and components A), B), C) and D), followed by addition of a further portion of component E).

14. The process for batchwise or continuous production of single-layer or multilayer lignocellulose materials according to claim 1, wherein carboxylic anhydrides are used as component A).

15. The process for batchwise or continuous production of single-layer or multilayer lignocellulose materials according to claim 1, wherein $C_4$ to $C_8$ carboxylic anhydrides are used as component F).

16. The process for batchwise or continuous production of single-layer or multilayer lignocellulose materials according to claim 1, wherein a portion or the entire amount, of component A) is mixed with component B) or a portion of component B) and with component E) or a portion of component E) to give a mixture ABE) before it is contacted with component LCP-1).

17. The process for batchwise or continuous production of single-layer or multilayer lignocellulose materials according to claim 16, wherein mixture ABE) comprises 50% to 99% by weight of component A) and 1% to 50% by weight of component B), and 0% to 49% by weight of component E).

18. The process for batchwise or continuous production of single-layer or multilayer lignocellulose materials according to claim 1, wherein the mixture of component A) and component B) is used in the form of an essentially anhydrous mixture.

19. The process for batchwise or continuous production of single-layer or multilayer lignocellulose materials according to claim 1, wherein wood shavings are used as component LCP-1).

20. A particleboard, fiberboard, or oriented strand board comprising a single-layer or multilayer lignocellulose material obtained by the process according to claim 1.

* * * * *